(12) United States Patent
Miner et al.

(10) Patent No.: US 7,616,272 B2
(45) Date of Patent: Nov. 10, 2009

(54) ELECTROLUMINESCENT FILMS FOR BACKLIGHTING LIQUID CRYSTAL DISPLAYS

(75) Inventors: Carla Miner, Carp (CA); Thomas MacElwee, Nepean (CA); Stephen Naor, Ottawa (CA); Howard Tweddle, Carp (CA)

(73) Assignee: Group IV Semiconductor Inc., Ottawa (CA)

( * ) Notice: Subject to any disclaimer, the term of this patent is extended or adjusted under 35 U.S.C. 154(b) by 257 days.

(21) Appl. No.: 11/840,511

(22) Filed: Aug. 17, 2007

(65) Prior Publication Data
US 2009/0046222 A1    Feb. 19, 2009

(51) Int. Cl.
*G02F 1/1335* (2006.01)
(52) U.S. Cl. ............................................. 349/69; 349/9
(58) Field of Classification Search .................... 349/69, 349/9
See application file for complete search history.

(56) References Cited

U.S. PATENT DOCUMENTS 5,121,234 A * 6/1992 Kucera ......................... 349/69
5,928,801 A * 7/1999 Broer et al. .................. 428/690

FOREIGN PATENT DOCUMENTS

| JP | 9033921 | 2/1997 |
| JP | 2004296162 | 10/2004 |
| WO | 2007073601 | 7/2007 |

* cited by examiner

*Primary Examiner*—Mike Qi
(74) *Attorney, Agent, or Firm*—Teitelbaum & MacLean; Neil Teitelbaum; Doug MacLean

(57) ABSTRACT

The present invention replaces the conventional cold cathode fluorescent tubes used in backlighting units of liquid crystal displays with an integrated electro-luminescent film structure, subdivided into electrically isolated micro-panels. Ideally, the electro-luminescent structure comprises separate red, green and blue micro-panels providing full color capabilities. Alternatively, the electro-luminescent film structure includes stacked groups of layers, in which each group emits a different color and is independently controllable.

25 Claims, 19 Drawing Sheets

Back (position of backlight)

1 Polarizer
2 Glass
3 Seal
4 Spacer
5 ITO
6 Hard coat
7 Polyimide
8 TFT

Figure 12a
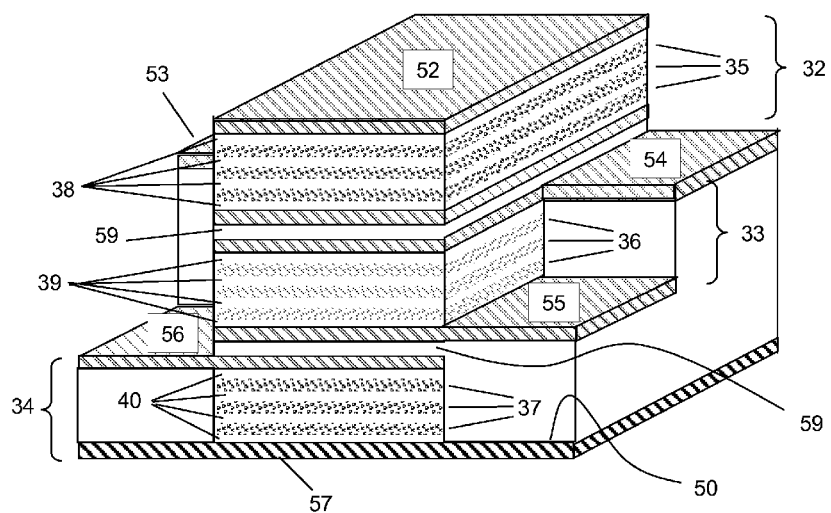
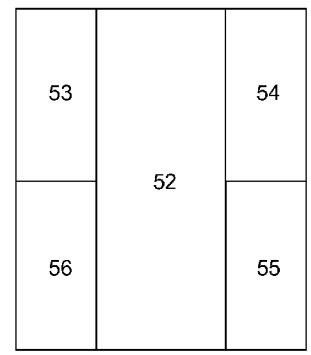
Figure 12b ically dominant display technology. Over 250 million
ELECTROLUMINESCENT FILMS FOR BACKLIGHTING LIQUID CRYSTAL DISPLAYS

TECHNICAL FIELD

The present invention relates to a backlight for a liquid crystal display (LCD), and in particular to a LCD backlight comprised of an electro-luminescent multi-layered film.

BACKGROUND OF THE INVENTION

Liquid crystal displays (LCD's) are rapidly becoming the universally dominant display technology. Over 250 million large, i.e. >10-inch, LCD flat-panel displays (FPDs) are built annually for the manufacture of televisions, desktop computer monitors and notebook computers, and over 1 billion smaller, i.e. <10-inch, displays are built annually for other applications, such as mobile phones and personal digital assistants (PDAs). Since LCD is a passive, i.e. non-emissive, technology, the display assembly usually requires a backlighting unit (BLU) in order to function in the application. Accordingly, there is a very strong demand for BLUs, e.g. annual BLU sales are approximately $14 billion and growing strongly as FPDs rapidly displace conventional cathode ray tube (CRT) technology in virtually all applications.

At the current state-of-the-art, the BLU is typically constructed using cold-cathode fluorescent (CCFL) tubes mounted in a complex arrangement that results in a very costly subassembly. In fact, the BLU for a typical LCD display today accounts for 25% to 35% of the bill-of-materials (BOM) cost. Therefore, there is a very strong motivation in the industry to find alternative methods of backlighting that reduce the BOM cost. In addition, the CCFL component contains mercury, which is classed as a toxic substance, creating a further motivation for displacing CCFL.

In order to produce a color image, the state-of-the-art LCD technology must incorporate a color filter (CF) component, which must be finely aligned with the LCD pixels. The color filter is another very costly element, accounting for some 20% of the BOM cost. In addition, the color filter degrades the contrast ratio and, more importantly, degrades the efficiency of the display by more than a factor of three, thus adding to the backlight cost and seriously impacting the energy efficiency of the FPD and therefore of the end-product.

Despite the serious cost and performance shortcomings of conventional BLU technologies that have been in use and incrementally improved over the last twenty-five years, the industry has so far been unable to create a viable alternative, which adequately addresses the fundamental issues of cost and efficiency.

FIGS. 1, 2 and 3 illustrate the construction of a conventional LCD display, including polarizers 1 mounted on the front and back of the display for filtering incoming and outgoing light, i.e. only passing light of a certain polarization into the liquid crystal and only passing light of a different polarization out of the LCD. Sheets of glass 2 are provided for sandwiching the liquid crystals therebetween and providing substrates for the remaining elements. Seals 3 and spacers 4 provide the necessary distance between the sheets of glass 2 and contain the liquid crystal therebetween. Transparent electrodes 5, e.g. a transparent conductive oxide (TCO) such as indium tin oxide (ITO), enable an electric field to be applied to the liquid crystal for altering the polarization of light passing therethrough, and therefore the amount of light that is able to pass through the top polarizer 1. A hard coat layer 6 and a polyimide film 7 provide protective coatings for the TCOs 5.

Thin-film transistor (TFT) control elements 8 define a matrix of independently addressable pixels through which the passage of light is controlled. A color filter (CF) layer 9 is comprised of a matrix of alternating red, green and blue filters enabling the color of the transmitted light to be controlled. The color filter layer 9 is the major cost driver in this assembly, accounting for some 20% of the bill-of-materials (BOM) cost of the FPD and also has very low optical efficiency, reducing the brightness of the display by 75%.

FIG. 2 illustrates the construction of a typical BLU that is mounted against the LCD assembly in order to build the complete FPD panel. Multiple elements are required in order to distribute the light from the CCFL tube 10 for the required brightness and uniformity including a cylindrical reflector 11 and a flat reflector 12. A wedge-shaped light guide panel (LGP) 13 redirects the light at a 90° angle through a diffuser sheet 14, a vertical prism sheet 15, a horizontal prism sheet 16, and a protective sheet 17. The BLU is typically supplied to the FPD maker as a complete subassembly that accounts for some 25%-35% of the BOM cost of the FPD.

An alternative method of backlighting, disclosed in U.S. Pat. No. 5,121,234 issued Jun. 9, 1992 to Kucera, consists of placing a panel of electro-luminescent (EL) material immediately behind the LCD display. This method can have a relatively low cost and enable a relatively simple and thin assembly compared with the CCFL approach. However, conventional EL technology, despite decades of development, has not been able to achieve brightness levels much beyond 100 cd/m$^2$, which is two orders of magnitude less bright than required in applications such as televisions and computer displays. Furthermore, even the best available EL materials have been unable to achieve anywhere close to the color gamut required in those applications or even in small color display applications, such as mobile phones. Therefore, EL technology at the current state-of-the-art is suitable as backlighting only for displays where high brightness and wide color gamut are not requirements, such as monochromatic displays for instrumentation or backlights for mobile phone keypads.

An object of the present invention is to overcome the shortcomings of the prior art by providing a backlighting arrangement that reduces the existing BOM cost and also provides a substantial efficiency improvement.

SUMMARY OF THE INVENTION

Accordingly, the present invention relates to a display comprising:

an electro-luminescent film structure for emitting light including an array of separate light emitting micro-panels;

a first polarizer for filtering the light emitted from the electro-luminescent device, thereby selectively emitting light of a first polarization;

a liquid crystal layer for rotating the polarization of the light passing therethrough to a second polarization in response to an electric field applied thereto;

first and second electrodes for applying the electrical field to the liquid crystal layer including pixelating means for addressing individual pixels within at least one of the first and second electrodes, whereby the electric field is appliable to selected pixels for rotating the polarization of the light passing therethrough; and a second polarizer for filtering the light emitted from the liquid crystal layer, thereby selectively passing light of the second polarization.

BRIEF DESCRIPTION OF THE DRAWINGS

The invention will be described in greater detail with reference to the accompanying drawings which represent preferred embodiments thereof, wherein:

FIG. 12a is an isometric view of a layered light emitting film structure with independently controlled stacks for emitting different colors in accordance with the embodiment of FIG. 10;

FIG. 12b is a top view of the layered light emitting film structure of FIG. 12a;

DETAILED DESCRIPTION

Figure 1:
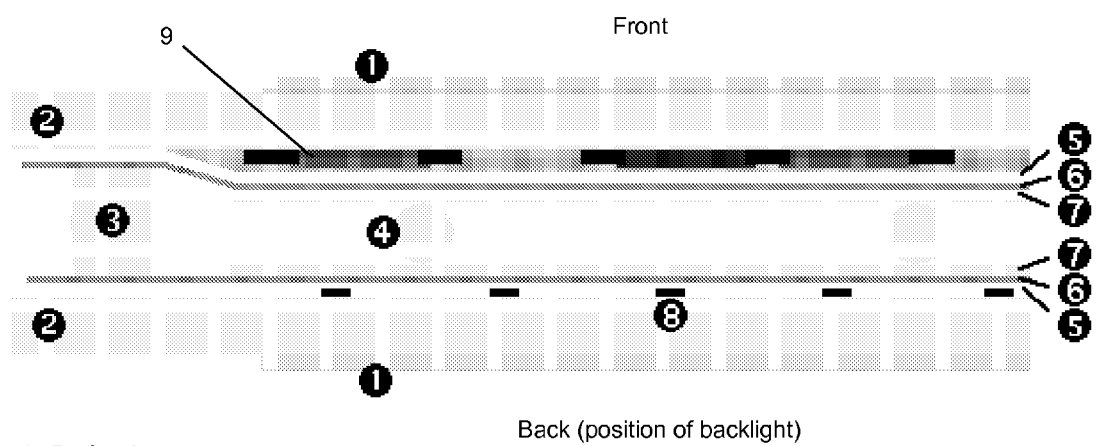
FIG. 1 is a cross-sectional view of a conventional LCD display.
Figure 2:
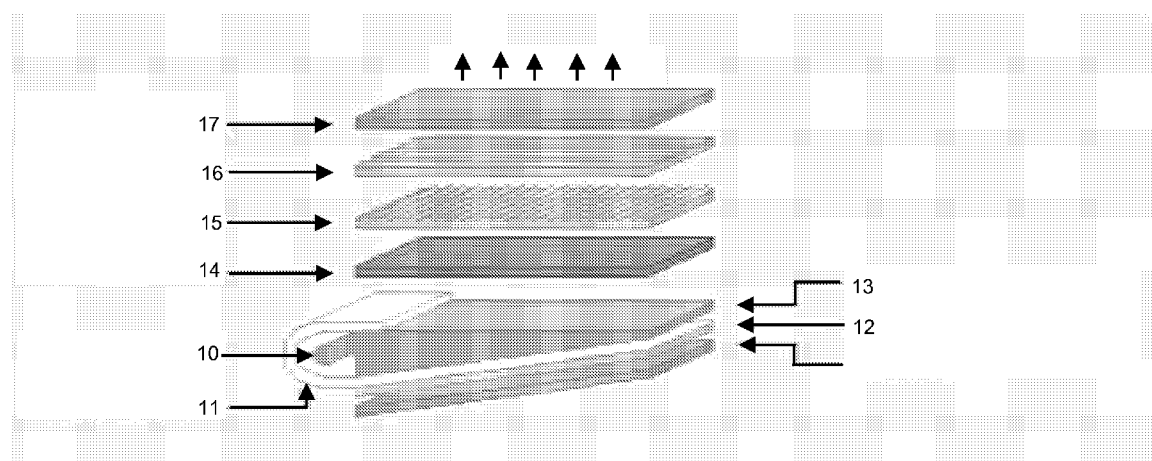
FIG. 2 is an exploded view of a conventional BLU.
Figure 3:
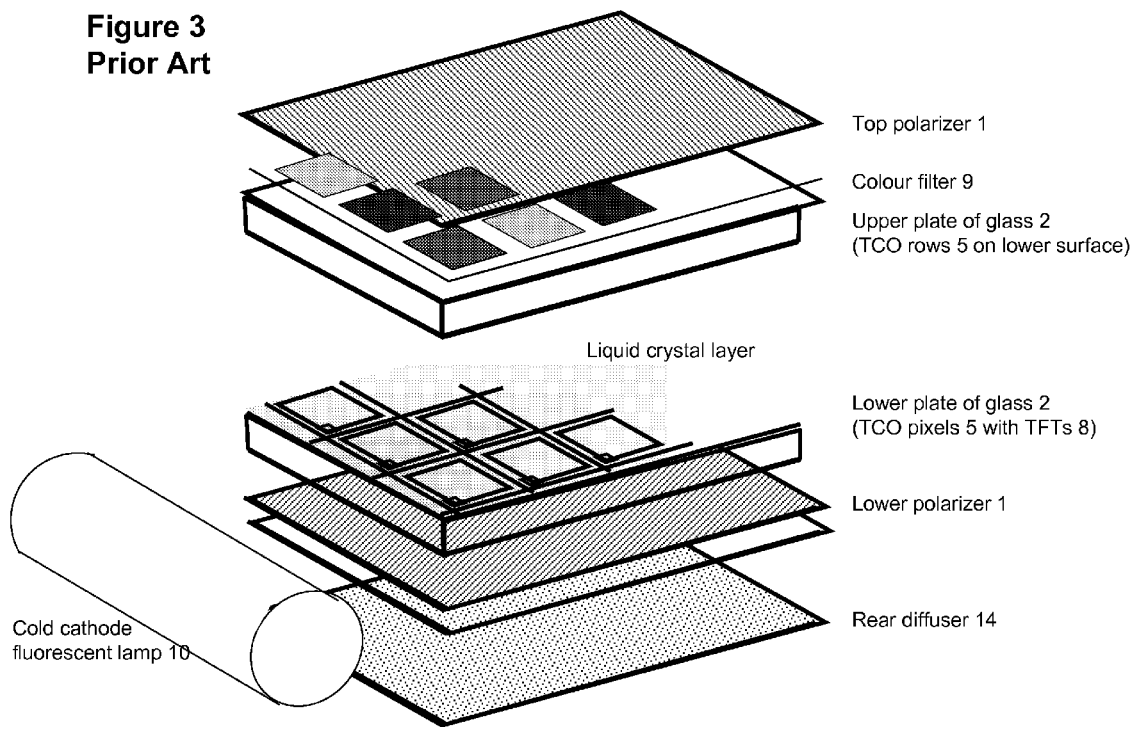
FIG. 3 is an exploded isometric view of a conventional LCD display.
Figure 4:
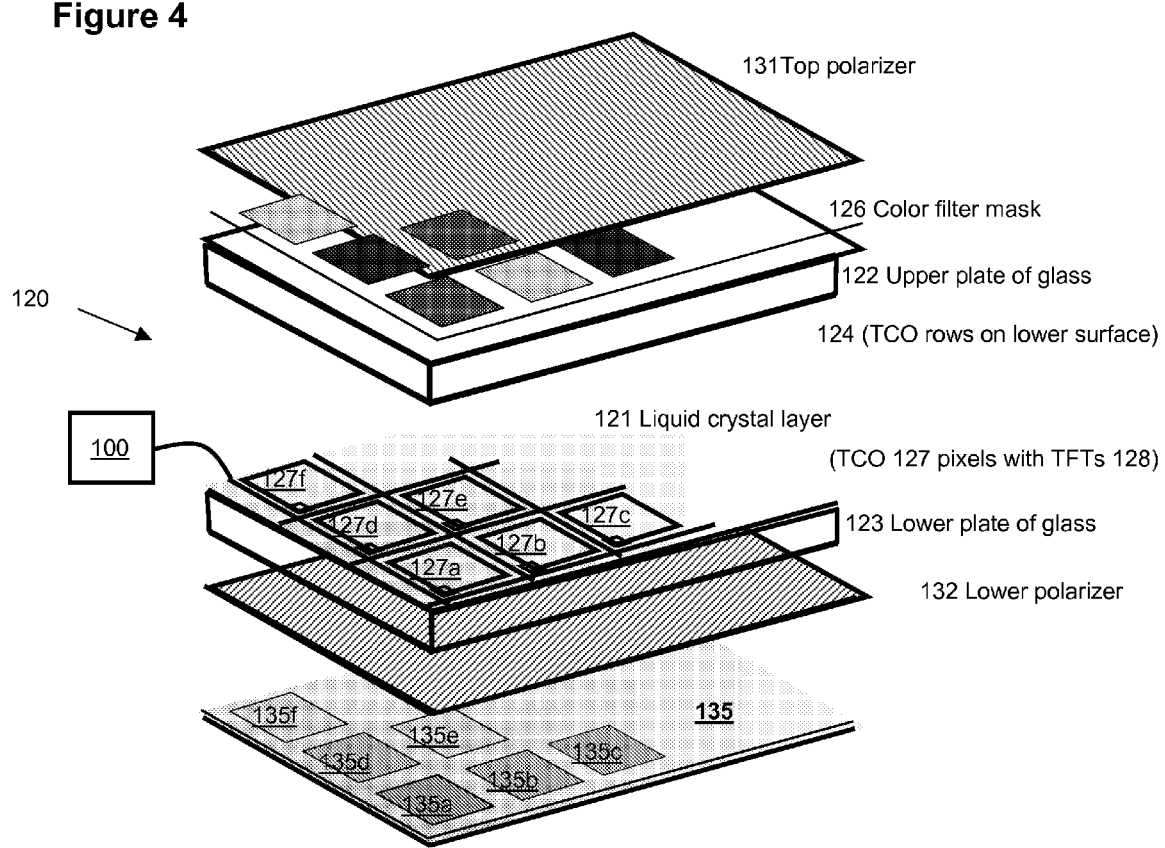
FIG. 4 is an exploded isometric view of an LCD display in accordance with the present invention.

With reference to FIG. 4, a liquid crystal display 120 in accordance with the present invention includes a liquid crystal material 121 sandwiched between upper and lower transparent substrates, e.g. glass plates, 122 and 123, respectively. A first transparent electrode 124, e.g. a transparent conductive oxide (TCO) such as indium tin oxide, is mounted adjacent the liquid crystal material 121 on a lower surface of the upper transparent substrate 122 to be supported thereby, while a color filter layer 126 is mounted on an upper surface of the upper transparent substrate 122 to be supported thereby. In alternative embodiments, the color filter layer 126 may be mounted instead on the lower surface of upper substrate 122, or on either surface of lower substrate 123. A second transparent electrode 127, e.g. a TCO such as ITO, is mounted adjacent the liquid crystal material 121 on an upper surface of the lower transparent substrate 123 along with thin film transistor (TFT) control elements 128. A lower polarizer 129 filters the incoming light, whereby only light of a certain polarization, e.g. horizontally polarized, is transmitted to the liquid crystal material, while an upper polarizer 131 only enables the light of a different polarization, e.g. vertically polarized, to pass, i.e. light rotated to the different polarization by the liquid crystal material.

The transparent electrodes 124 and 127 enable an electric field to be applied to the liquid crystal material 121 for altering the polarization of light passing therethrough, and therefore the amount of light that is able to pass through the top polarizer 131. The thin-film transistor (TFT) elements 128 controlling the TCO layer 127 define a matrix of independently addressable pixels, six or which are identified as 127a to 127f, through which the passage of light is controlled. Other means for pixelating the TCO layer 127 are within the scope of the invention, as well as pixelating the first transparent electrode 124. The color filter (CF) layer 126 is comprised of a matrix of alternating red, green and blue filter sections enabling the color of the transmitted light to be controlled by selectively activating the liquid crystal pixels beneath the different colored filter sections to control the amount of red, blue and green light to pass corresponding to a desired color.

Figure 5A:
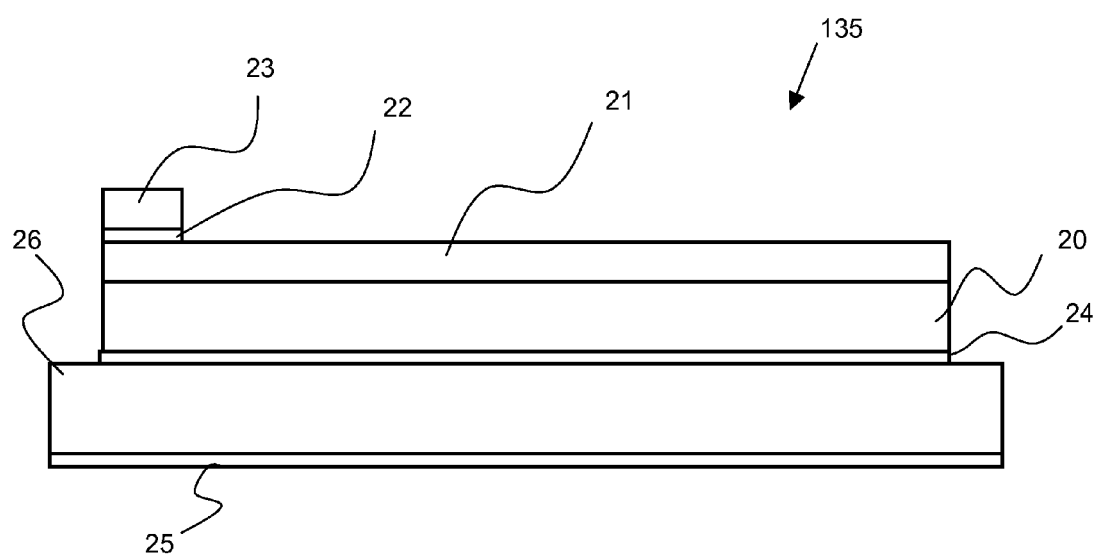
FIG. 5a is a side view of an electro-luminescent structure of the display of FIG. 4.

One embodiment of an electro-luminescent solid-state device 135 according to the present invention, shown in FIG. 5a, incorporates a conductive substrate 26, such as N-type or P-type silicon or a conductive film deposited on a substrate of glass. A light-emitting film structure 20 ("layered light emitting film structure"), including one or more relatively thin active layers with luminescent centers, e.g. (i) rare earth elements in an oxide matrix; (ii) silicon nano-particles in a silicon nitride matrix, or (iii) zinc oxide, is deposited onto the top of the conductive substrate 26. The film structure 20 can be deposited by one of many suitable methods, such as plasma enhanced chemical vapor deposition (PECVD), molecular beam epitaxy, pulsed laser deposition, sputtering, and sol-gel processes. An upper optically-transparent electrode layer 21, e.g. indium tin oxide (ITO), is mounted on the film structure 20, which, along with a back electrical contact 25, enables AC or DC power to be applied thereto. Preferably, the upper transparent electrode layer 21 has a thickness of from 150 to 500 nm. Preferably, the chemical composition and the thickness of the upper transparent electrode layer 21 are such that the light emitting structure 20 has a resistivity of less than 70 ohm-cm. To enhance adhesion or provide a diffusion barrier, an intermediate electrical contact layer 22, e.g. TiN, may be positioned between the upper transparent electrode layer 21 and an upper electrical contact 23, e.g. a metal such as aluminum. The electrical contact layer 22 provides an ohmic contact point between the upper electrode layer 21 and the upper electrical contact 23, while the upper electrical contact 23 provides a suitable surface for wire bonding contact. Other suitable materials for the upper transparent electrode layer 21 and electrical contact layer 22 might alternatively be employed. A back reflector 24 can be provided between the film structure 20 and the substrate 26 to reflect light, which is internally emitted towards the substrate 26, back towards the emitting surface, i.e. the upper electrode layer 21.

Figure 5B:
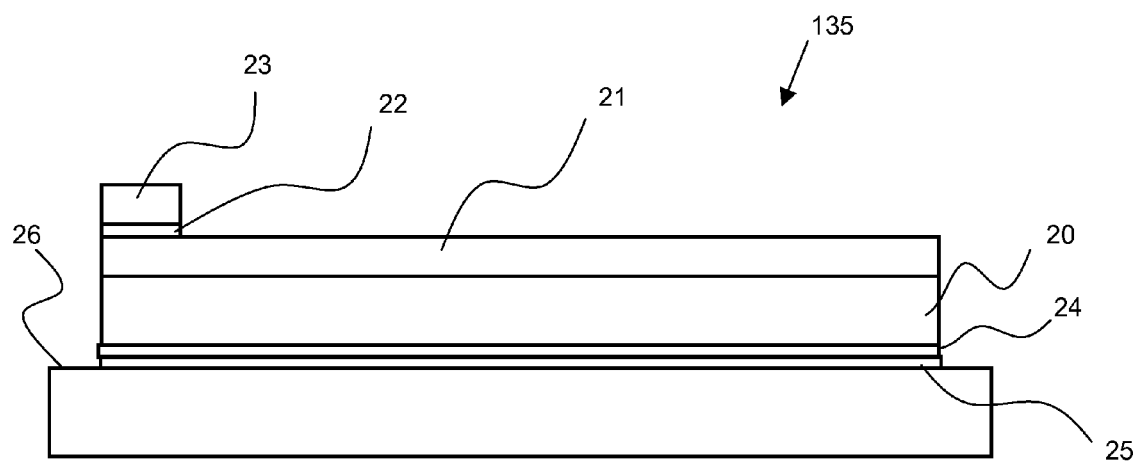
FIG. 5b is a side view of an alternative electro-luminescent structure of the display of FIG. 4.
Figure 5C:
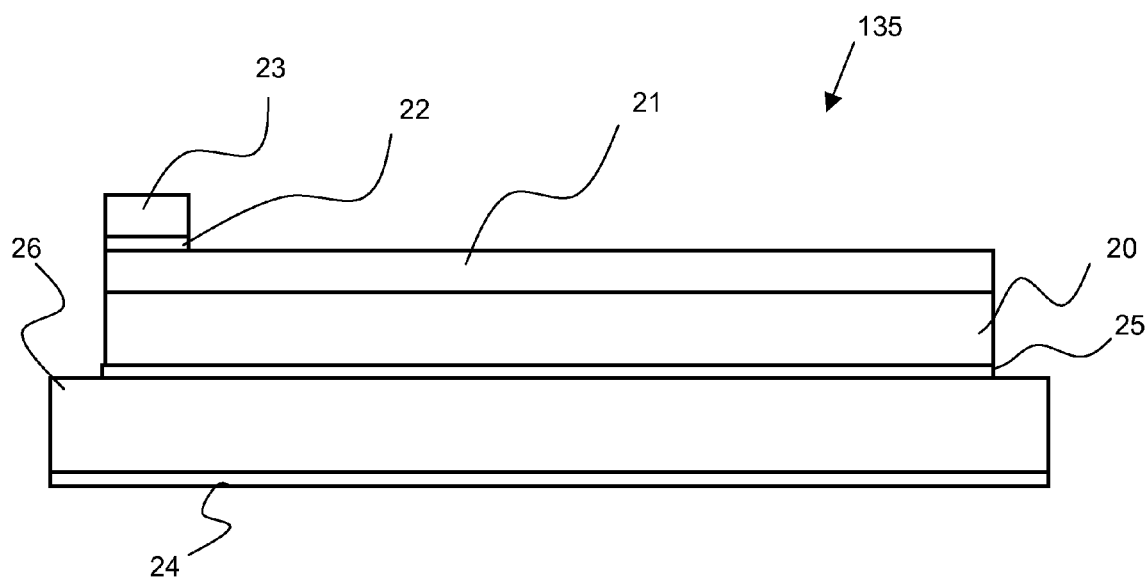
FIG. 5c is a side view of an alternative electro-luminescent structure of the display of FIG. 4.
Figure 5D:
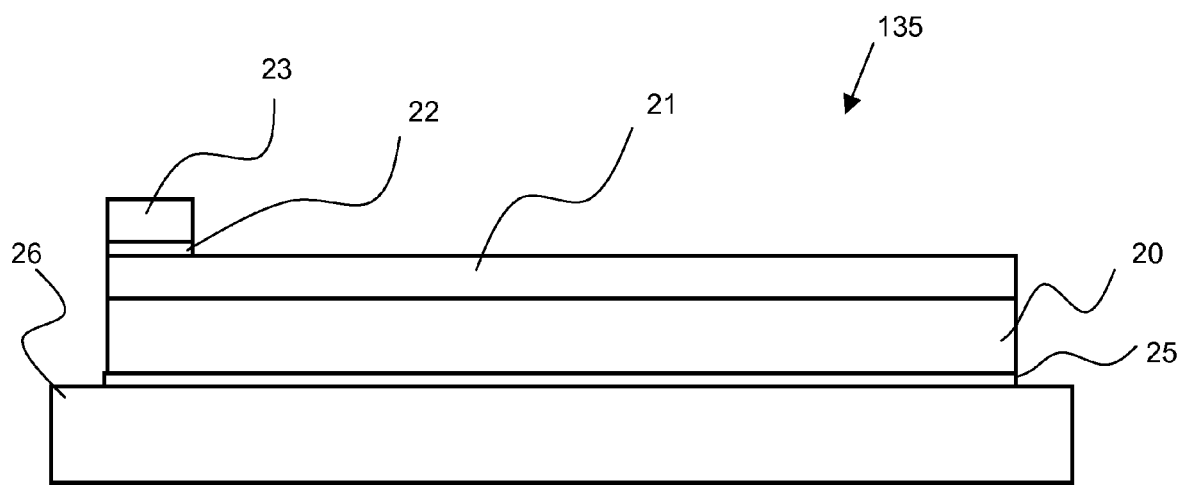
FIG. 5d is a side view of an alternative electro-luminescent structure of the display of FIG. 4.

In another embodiment of an electro-luminescent solid-state device 135 according to the present invention, shown in FIG. 5b, the lower electrode 25 is applied to the top of the substrate 26, in which case the substrate 26 may be non-conductive. The lower electrode 25 may be on either side of, or combined with, the optional back reflector layer 24. If the substrate 26 is transparent, e.g. glass, and the lower electrode 25 is also transparent, e.g. indium tin oxide (ITO), the back reflector layer 24 may be placed on the underside of the substrate 26, while the lower electrode 25 is positioned between the substrate 26 and the film structure 20, as in FIG. 5c. In another embodiment, shown in FIG. 5d, the light is emitted through the transparent substrate 26, instead of through the upper electrode layer 21. Accordingly, the upper electrode layer 21 is reflective, and the substrate 26 and lower electrode 25, which is deposited onto the substrate 26, are transparent.

The substrate 26, on which the film structure 20 is formed, is selected so that it is capable of withstanding high temperatures in the order of 600° C. or more. Examples of suitable substrates include silicon or poly silicon, either of which can be n-doped or p-doped, e.g. with $1 \times 10^{20}$ to $5 \times 10^{21}$ of dopants per cm$^3$, fused silica, high temperature glass, zinc oxide, quartz, sapphire, silicon carbide, or metal substrates. The substrate 26 can optionally have a thermally grown oxide layer, which oxide layer can be of up to about 2000 nm in thickness, a thickness of 1 nm to 20 nm being preferred. The substrate 26 can optionally have a deposited electrically conducting layer, which can have a thickness of between 50 nm and 2000 nm, but preferably between 100 nm and 500 nm. The thickness of the substrate is not critical, as long as thermal and mechanical stability is retained.

The layered light emitting film structure 20 can be comprised of a single active layer or of multiple active layers, each layer having an independently selected composition and thickness, for example: rare earth oxides or other semiconductor material with luminescent centers activated by impact ionization or impact excitation. In a preferred embodiment the active layers are comprised of rare earth elements, e.g. Er, Ce, Eu, Tb, in a silicon dioxide (SiO$_2$) matrix for the active layers, with SiO$_2$ for the buffer layers. Alternatively, the active layers may comprise semiconductor nano-particles, such as a group IV semiconductor (e.g. Si, Ge, Sn and PB) in a wide bandgap semiconductor or dielectric matrix, such as a group IV (e.g. Si, Ge, Sn and Pb) oxide or nitride matrix with or without rare earth doping elements and with or without carbon doping, as will hereinafter be described. By using active layers having different compositions, a multi-color structure can be prepared. For example, combining terbium layers, cerium layers and europium layers in a single multi-layer structure provides a structure that can luminesce at green (terbium), blue (cerium), and red (europium) or color combinations thereof, e.g. white. The layers can be either stacked or constructed side by side as separately controllable circuit elements.

Figure 6:
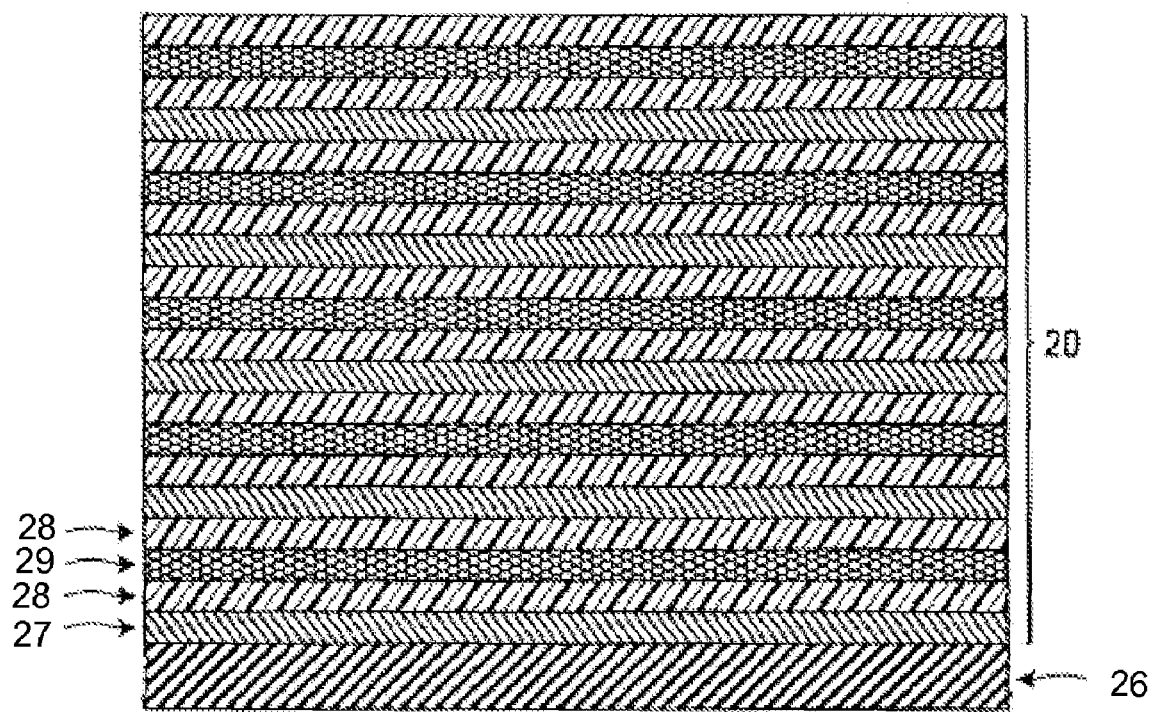
FIG. 6 is a cross-sectional view of a layered light emitting film structure in accordance with the device of FIG. 4.

One type of preferred layered light emitting film structure 20, provided by an embodiment of the present invention, is a multi-layered emitter structure, shown by way of example in FIG. 6, which structure comprises multiple active layers 27 and 29, e.g. terbium in a silicon dioxide matrix, with wide bandgap semiconductor or dielectric buffer layers 28, e.g. silicon dioxide, otherwise known as "drift" or "acceleration" layers, deposited on the substrate 26. Each of the active layers 27 and 29 has a thickness of from 1 nm to 10 nm. Each of the active layers 27 and 29 can comprise the same or different material, e.g. rare earth elements terbium and cerium, for generating the same or different wavelength of light, e.g. all of the active layers 27 emit one wavelength and all of the active layers 29 emit a second wavelength. The two wavelengths of light generated by the two sets of active layers 27 and 29 are combined together or with additional layers (not shown) to generate a desired color, e.g. white. The active layers 27 and 29 are separated by buffer layers 28, such as silicon dioxide layers. The upper transparent electrode layer 21 is deposited on top of the multi-layer film structure 20. There is no maximum thickness for the layered light emitting film structure, although a thickness of from 50 nm to 2000 nm is preferred and a thickness of from 150 nm to 750 nm is more preferred depending upon the available amount of voltage.

The structures shown in FIG. 6 and the figures that follow show adjacent layers in contact with each other without intervening layers; however, additional layers can be utilized to the extent they do not interfere with the recited layers. Therefore, the terms coating and in contact do not exclude the possibility of additional intervening but non-interfering layers.

By embedding semiconductor nano-particles in a semiconductor nitride matrix, e.g. a group IV semiconductor, such as silicon, nano-particles in a group IV semiconductor, such as silicon, nitride matrix, the radiative lifetime of the semiconductor nano-particles can approach the nanosecond and/or sub-nanosecond regime due to the effect of surface passivation of the nano-particles by nitrogen atoms, and the effect of strong coupling of electron and hole wave functions of the excitons. However, uniformly deposited SiN$_x$ films, in which semiconductor nano-particles are formed therein, generally have a relatively wide range of size, and a random spatial distribution, specifically the separation distances between nano-particles. In addition, semiconductor nano-particles formed in semiconductor nitride films may form connected small clusters when subjected to higher temperature, which would affect light emitting efficiency, thereby severely limiting device processing flexibility after film deposition. A combination of variations of nano-particles size and separation distance could result in significant impact on the electro-luminescence efficiency of semiconductor nano-particles structures formed in such films.

In the films in which semiconductor nano-particles are embedded in a semiconductor nitride matrix, current conduction in the films might be significantly affected by the high trap density of the semiconductor nitride host and hence impose detrimental effects on the effectiveness of injected charge carriers to gain energy from the electrical field to create excitons in the semiconductor nano-particles. However, the layered light emitting film structure according to the present invention eliminates all of the aforementioned problems by providing buffer ("drift" or "acceleration") layers in between active layers of semiconductor nitride, thereby ensuring the proper distance between nano-particles. Moreover, providing thin active layers, i.e. nano-particle, size, the size of the nano-particles can be more closely controlled.

Figure 7A:
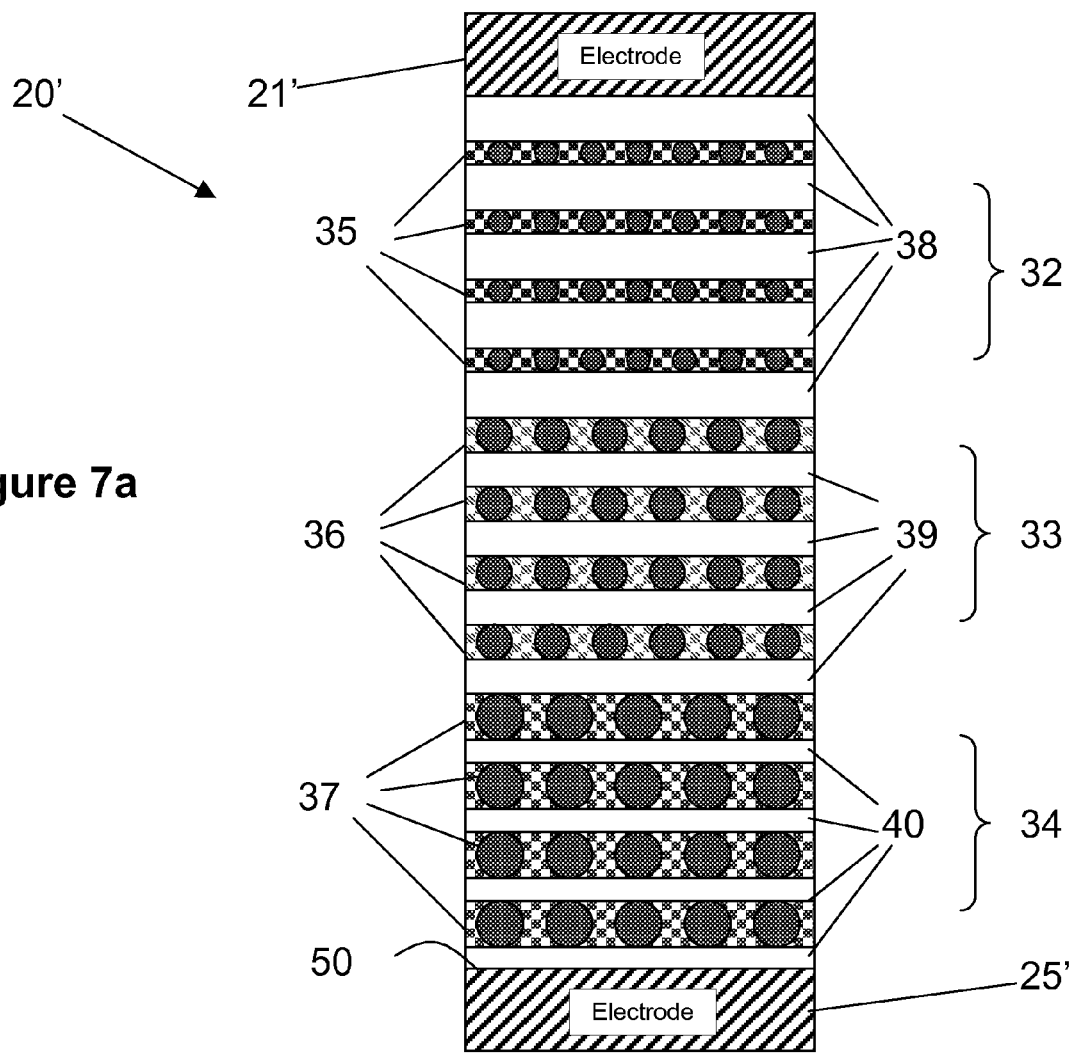
FIG. 7a is a cross-sectional view of an alternative layered light emitting film structure in accordance with the device of FIG. 4.
Figure 7B:
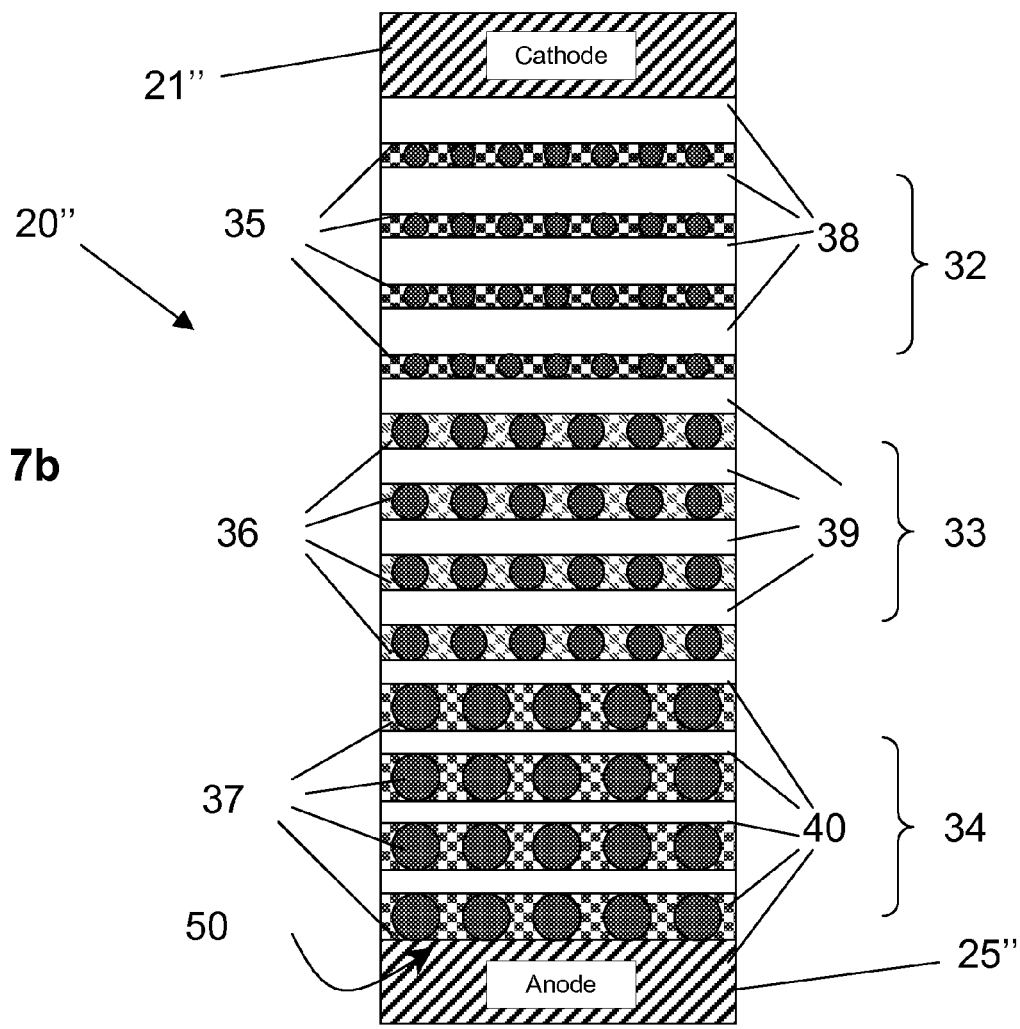
FIG. 7b is a cross-sectional view of an alternative layered light emitting film structure in accordance with the device of FIG. 4.

With particular reference to FIGS. 7a and 7b, a layered light emitting film structure 20' or 20", according to another embodiment of the present invention, is formed by a plurality of different stacks 32, 33 and 34 of organized layers, in which the active layers 35, 36 and 37 are separated by buffer layers 38, 39 and 40, respectively, comprised of a pure wide bandgap semiconductor or dielectric material.

For layered light emitting film structures 20' driven by AC voltage, a pair of electrodes 21' and 25' are positioned on opposite sides of the stack of layers 35 to 40. Buffer layers 38 and 40 are disposed next to the electrodes 44 and 45, respectively, as the current will flow in both directions as the voltage oscillates. Ideally one of the electrodes, e.g. electrode 21', is transparent, e.g. ITO, and a reflective layer or coating 50 is added between one of the electrodes, e.g. electrode 25, and the remaining stack of layers 35 to 40 to reflect any light back through the transparent electrode 21'.

In the case where the luminescent centers are comprised of nano-particles, the size of the nano-particles must be determined since the wavelength emitted is a function of nano-particle size. The size of the nano-particles, e.g. nanocrystals, is approximately equal to the thickness of the active layer 35, 36 and 37 (or 27 and 29 above) in which they reside (+10%). The size of the nano-particles in each active layer 35, 36 and 37, i.e. the thickness of the active layer 35, 36 and 37, is designed for a specific excitation energy to produce a desired colored light emission. A theoretical relationship between nano-particle diameter d (in nanometers) and excitation energy E (in electron-volts) for silicon nano-particles in a silicon dioxide matrix host doped with rare earth is given by:

$$E=1.143+5.845/(d^2+1.274d+0.905)-6.234/(d^2+3.391d+1.412);$$

For example, ~1.9 eV for red photons (d=2.9 nm), ~2.3 eV for green photons (d=2.1 nm), or ~2.8 eV for blue photons (d=1.6 nm).

For group IV, e.g. silicon, nano-particles in a, group IV, e.g. silicon, nitride matrix host without rare earth doping or for group IV, e.g. silicon, nano-particles in a silicon dioxide matrix host without rare earth doping the excitation energy equation to generate a specific excitation energy to produce a desired colored light emission from the nano-particles has been shown to be:

$$E=E_0+C/d^2$$

Where $E_0=1.16$ eV and $C=11.8$ eV-nm$^2$

Accordingly, the thickness of the red light emitting layer, i.e. the diameter of the nano-particles in an active layer with silicon nano-particles in a silicon nitride matrix, is 4 nm, 3.25 nm for the green light emitting layer, and 2.6 nm for the blue light emitting layer.

The thickness of active layers with luminescent centers other than nano-particles, e.g. only rare earths in a suitable matrix, is typically determined empirically based on a tradeoff between the energy requirements and the brightness of the light. On the one hand, if the active layer is infinitely thin then the energy would be precisely known for the whole layer and therefore energy matching could be optimized; however, if the active layer is infinitely thin, there would be no luminescent centers and no light. The thicker the active layer is, the brighter the layer can be, since there would be more luminescent centers per sq mm; however, the energy will not be optimum throughout the entire thickness so there will be a loss of efficiency.

The thickness of the buffer layers 38, 39 and 40 (or 13 above) are determined as a function of the wavelength, and therefore of the required excitation energy of the corresponding active layers 35, 36 and 37 (or 27 and 29 above). For an electric field applied perpendicular to the plane of the layers 35 to 40, an electron must gain sufficient energy from the applied electrical field to excite the luminescent centers to the correct energy—the energy gained in the buffer layers 38, 39 and 40 (measured in eV) is equal to the electric field multiplied by the thickness of the buffer layer 38, 39 or 40. For example, for an applied electrical field of 5 MV/cm, the thickness of the buffer layer must be 3.8 nm or thicker to excite a luminescent center to 1.9 eV (1.9 eV/0.5 eV/nm=3.8 nm), 4.6 nm or thicker to excite a luminescent center to 2.3 eV, or 5.6 nm or thicker to excite a luminescent center to 2.8 eV. For layered light emitting film structures 20' powered by AC electrical power, in which neighboring active layers, e.g. 35 and 36, emit at different wavelengths, the intervening buffer layer, e.g. 38, must be thick enough to excite the luminescent centers in the higher energy layer.

The layered light emitting film structure 20, 20' or 20" provides a great improvement in luminous flux (optical output power), efficiency (internal power conversion efficiency and external luminous efficacy), color rendering index (CRI), device reliability and lifetime, and device manufacturability/cost/yield of solid state light emitting devices based on any type of luminescent centers activated by impact ionization or impact excitation, e.g. rare earths or silicon nano-particles.

Rare earth ions may be incorporated into the active layers 35, 36 and 37, into the buffer layers 38, 39 and 40, or into both. The preferred structure incorporates rare earths only within the active layers 35, 36 and 37, with a concentration such that the efficiency of energy transfer from the nano-particles to the rare earth ions is maximized and the radiative emission efficiency of the excited rare earth ions is maximized. Due to the complexity of the physical processes involved, optimization is generally an empirical process. The rare earth ion species placed within or next to a nano-particle active layer is selected to radiate at a wavelength matched to the excitation energy of the nano-particles within the active layer (or vice versa). Preferably, the rare earth elements are a lanthanide element, such as cerium, praeseodymium, neodynium, promethium, gadolinium, erbium, thulium, ytterbium, samarium, dysprosium, terbium, europium, holmium, or lutetium; however, they can also be selected to be an actinide element, such as thorium.

Other impurities, if required, will typically be incorporated only within the nano-particle active layers 35, 36 or 37, although they could be placed anywhere within the structure 20, 20' or 20". For example, since observations have determined that the measured excitation energy of a nano-particle is not as high as expected theoretically, carbon atoms may be required to raise the excitation energy of the nano-particles transferred to the rare earth ions in the wide bandgap semiconductor or dielectric, e.g. silicon oxide, matrix.

The buffer layers 38, 39 and 40 should be of the highest quality, i.e. dense with few defects, achievable with such materials, within the capabilities of a specific processing technology, whereby the device lifetime and reliability under a high applied electric field will be maximized.

Silicon-rich silicon oxide, with or without carbon and rare earth doping, for the active layers 35, 36 and 37, and silicon dioxide for the buffer layers 38, 39 and 40 are the preferred materials in the layered light emitting film structure. Other material systems, such as silicon-rich silicon nitride with or without rare earth doping for the active layers 35, 36 and 37, and silicon nitride for the buffer layers 38, 39 and 40, can also be used in this layered light emitting film structure. Rare earth oxides, which also act as luminescent centers, can also be used in the active layers 35, 36 and 37. Zinc oxide is also a suitable material for use in the active layers as a luminescent center. Alumina (aluminum oxide) is also a suitable matrix in which to embed the luminescent centers such as rare earths.

The density of the luminescent centers in any layer can be changed by varying the deposition conditions in the layer during deposition and by varying the annealing conditions (annealing temperature and time, for example). The luminescent center density, within the active layers 35, 36 and 37, is preferably as high as possible to increase the intensity of emitted light, while still remaining below the density that would result in interactions between the luminescent centers, i.e. quenching, or agglomeration thereof, i.e. clustering.

The total number of repeated layers 35 to 40 in the layered light emitting film structure 20, 20' or 20" is determined by the voltage that will be applied to the entire film and by the electric field required for efficient and reliable operation. In a simple approximation, very little voltage is dropped across the active layers 35, 36 and 37, so that the number of layers required will be equal to the applied voltage divided by the electric field and divided by the thickness of the buffer layers 38, 39 and 40. For example, if the applied voltage is 110V, the desired electric field within one dielectric layer 39 is 5 MV/cm (i.e. 0.5 V/nm), and the desired excitation energy is 2.3 eV, then the dielectric layer is 4.6 nm thick, and the total number of repeated layer pairs 36/39 is:

(110 V)/(0.5 V/nm)/(4.6 nm)=48 layers or pairs.

A single color can be emitted by the layered light emitting film structure 20, 20' or 20" by repeating identical pairs of active and dielectric layers, e.g. the layered light emitting film structure 20 with identical active layers 27 and 29. Mixed colors, e.g. white, can be emitted by the layered light emitting film structure 20, 20' or 20", since the entire film will comprise several layer pairs for each constituent color. For example, N pairs of active/dielectric layers altogether may comprise k pairs for blue 35/38, m pairs for green 36/39, and n pairs for amber/red/orange 37/40, where k+m+n=N. The number of each of the color pairs, e.g. 35/38, 36/39 and 37/40, can be varied so that any desired color rendering index (CRI) can be achieved. For example, a warm white requires more pairs of red than blue 35/38, while a cool white requires the opposite.

For white or other multi-color light emission, and for a device in which a back reflector 50 is included in the structure, it is preferable to place the lowest energy (longest wavelength, e.g. red) emission layers nearest to the reflector 50 and the highest energy (shortest wavelength, e.g. blue) layers nearest to the emitting surface. Layers emitting intermediate wavelengths, e.g. green, are placed intermediate the layers emitting the longest and shortest wavelengths. Alternatively, in the case in which a transparent substrate is employed, the reflective layer 50 may be positioned on the opposite side of the substrate.

FIG. 7b illustrates a layered light emitting film structure 20" powered by DC electrical power, i.e. an anode 21" and a cathode 25". The active layers 35, 36 and 37 and most of the buffer layers 38, 39 and 40 are identical to those in the layered light emitting film structure 20'; however, since the electrons only travel in one direction, the intervening buffer layers between different types of active layers must be the correct thickness to excite the luminescent centers in the active layer closer to the anode 25". Accordingly, the layered light emitting film structure 20" is preferably terminated by one of the first buffer layers 38 at the cathode 21" and by an active layer 37 at the anode 25". Moreover, since the electrons travel only in one direction, i.e. from the cathode to the anode, one of the second buffer layers 39 is between the first stack 32 and the second stack 33, and one of the third buffer layers 40 is between the second stack 33 and the third stack 34.

In FIG. 4, the electro-luminescent solid-state device 135 is illustrated as having a plurality of uniformly or independently controlled micro-panels, six of which are indicated by 135a to 135f, which substantially align with an N×M array of pixels, six of which are indicated by 127a to 127f, defined by the TFT elements 128, whereby light only is generated where it is useful, i.e. not under the TFT pixelation elements; however, it may be advantageous, from a manufacturing point of view, to have the light generated quasi uniformly to eliminate the need to align the separate substrates, whereby the EL device 135 emits light continually, and only the liquid crystal pixels control the passage of light. Accordingly, only a few (two to fifty) large micro-panels, each of which provides light to several of the pixels, is possible.

Studies into the planar breakdown of thin oxides, such as the ones used for the upper and lower electrode layers 21 and 25, respectively, have shown that the edges of the upper electrodes 21 cause an enhanced concentration of the electric field over the layered light emitting film structure 20. Placing a field oxide region below the upper electrode layers 21 has been suggested in International Patent Application No. WO 2007/073601, published Jul. 5, 2007, by the applicant of the present application, which is incorporated herein by reference, to minimize current injection below the upper electrode layer 21, thereby maximizing current flow in the light emitting structure 20 adjacent to the upper electrode layer 21. The edges of the upper electrode 21, which are over the thick field oxide region, exhibits potential contours that are more spread out resulting in a reduction of the electric field at the edge of the upper electrodes 21, which is due to the increased thickness of the field oxide region. The thick field oxide region further imposes a potential barrier to direct current flow between the upper and lower electrodes 21 and 25 and the substrate 26. The incorporation of the thick field oxide into the EL device 135 significantly reduced the incident of edge related electric field concentration and breakdown.

An EL device based on the thick field oxide does not necessarily allow for the formation of arbitrarily large area micro-panels, because asperities or non-uniform film thicknesses, caused from the deposition techniques, can result in localized increases in the electric field under bias leading to the formation of breakdown spots or hot spots in the bottom of the light emitting structure. At low excitation power levels, the planar breakdowns that take place in the active area of the EL device 135 well tend to be of the self healing type. As the bias across the EL device 135 is increased, a breakdown or a hot spot forms where it is believed that the current on a microscopic scale increases suddenly and this leads to a rupture of the dielectric properties of the layered light emitting film structure 20 and a large amount of energy stored in the cables connecting the EL device 135 to the power source is suddenly released. As a result of this, the layered light emitting film structure 20 and the upper electrode layers 21 in the immediate surrounding area are vaporized and a crater is left behind. The defect that was the site of the initial breakdown/rupture has also been removed and ejected by this process and the pixel is found to continue to operate until the bias is increased and the next weakest point in the layered light emitting film structure 20 is found and the process repeats itself.

The aforementioned mode of breakdown is typically self healing; however, if the bias is large enough, when there is a rupture of the layered light emitting film structure 20 in a large area pixel, the breakdown will cease to be self healing and will become propagating in nature. Accordingly, the breakdown will continue with a burning action/arc in which the layered light emitting film structure 20 and the upper electrodes 21 in effect burn up. If left unchecked, the burning can continue with the near complete consumption of the entire active area well in the layered light emitting film structure 20 of the EL device 135, unless the current to the EL device 135 is terminated.

Figure 8:
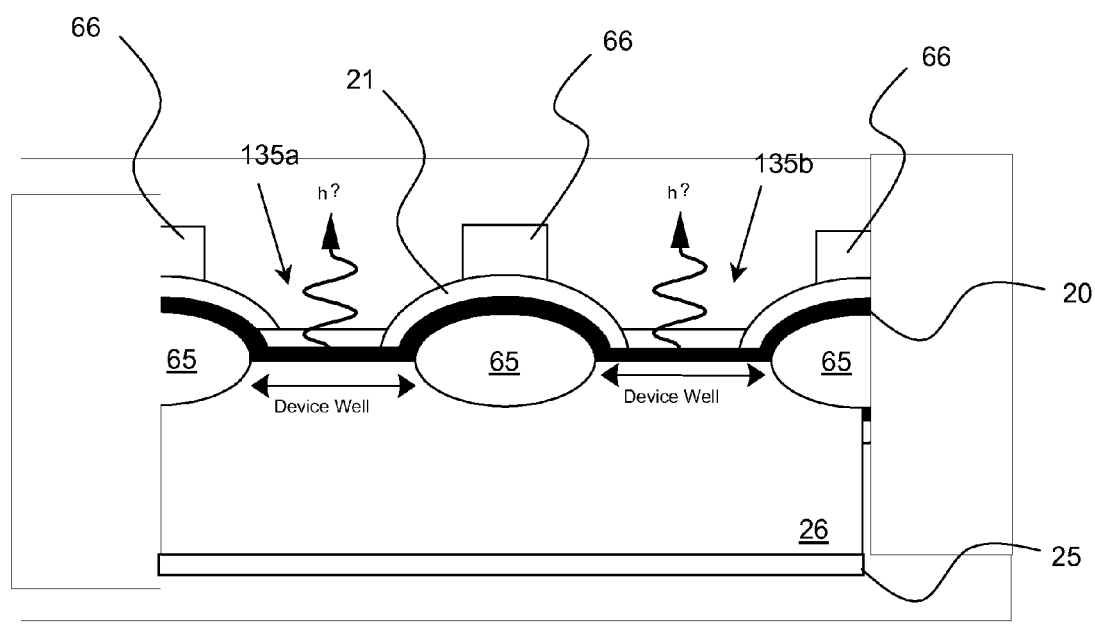
FIG. 8 is a cross-sectional view of a multi-paneled electro-luminescent structure.

With particular reference to FIG. 8, to overcome the problems with large area emitting structures, such as propagating breakdown, the total emitting area of the layered light emitting film structure 20 is subdivided into smaller area micro-panel emitters, e.g. 135a to 135f, that are laterally isolated from one another by the presence of thick field oxide regions 65. The presence of the thick field oxide regions 65 between adjacent micro-panels, e.g. 135a to 135f, serves to electrically isolate the light emitting structure 20 and the upper electrode 21 from the underlying substrate 26, whereby connections to metal power buses 66 can be made to the upper electrode 21 without resulting in a breakdown directly under the metal power buses 66. Secondly the thick field oxide regions 65 serve as a barrier to disrupt the propagating nature of a high bias failure.

To construct the EL device 135, the micro-panel emitters, e.g. 135a to 135f, are patterned and the thick field oxide regions 65 are grown using a LOCOS technique. Alternatively, a thick field oxide layer can be grown over the substrate 26 and then etched back to the bare substrate 26 defining the thick field oxide regions 65. As a result of either initial step, device wells are formed surrounded by the thick field oxide regions 65 to provide lateral isolation from adjacent device wells. Subsequently, the layered light emitting film structure 20, 20'or 20" is deposited using any suitable technique, e.g. sputtering, spin on, LPCVD, PECVD, ALE, MOCVD, or MBE techniques. The layered light emitting film structure 20 is deposited as a blanket layer or multi-layer structure over top of a plurality of device wells, i.e. micro-panels 135a to 135f, and a plurality of field oxide regions 65 requiring no patterning and etching as isolation between micro-panel, e.g. 135a, to micro-panel, e.g. 135b, is provided by the thick field oxide regions 65. The upper and lower electrodes 21 and 25 are then deposited as blanket layers, again using sputtering, spin on, LPCVD, PECVD, ALE, MOCVD, or MBE techniques. The upper electrode 21 is conductive and forms the upper contact electrode for all of the micro-panels, e.g. 135a to 135f, simultaneously. Lateral isolation between adjacent micro panels, e.g. 135a to 135f, is provided by the thick field oxide regions 65. A schematic representation of the micro-paneled structure is shown in FIG. 8, in which the thick field oxide regions 65 separating the two device wells, i.e. micro-panels 135a and 135b. In a large area emitter, there would be many of the micro-panels arranged in a larger array.

Once a propagating breakdown event is established in a micro-panel, e.g. 135a to 135f, the burn front will move to consume both the layered light emitting film structure 20 and the upper electrode layer 21 laterally as long as the current source to the devices is maintained. As the burn front approaches the edge of the device well, i.e. the micro-panel, it will start to travel up and out of the device well as both the layered light emitting film structure 20 and the upper electrode 21 are continuous on top of the thick field oxide regions 65. When this happens, the impedance of the arc will start to increase and there will be a tendency for the arc to self extinguish as the arc is established between the upper electrode 21 and the substrate 26. The extinguishing of the arc is due to the reduction of the electric field across the emissive layer stack of the upper electrode 21 as the burn front moves up the thick field oxide region 65 and away from the substrate 26. Accordingly, the inclusion of the thick filed oxide regions 65 between adjacent micro-panels 135a and 135b causes a propagating breakdown event to become an isolated event that is localized in the originating micro-panel. The breakdown event is effectively isolated by the presence of the thick field oxide regions 65 rendering the rest of the micro-panels in the large area array largely unaffected where they continue to operate under bias, whereby the thick field oxide regions 65 provide a built in self limiting mechanism by which propagating breakdowns are terminated without adjusting the bias current.

There are additional benefits to designing large area emitters as a micro-paneled device. Most importantly, the metallization interconnect that supplies power via the upper electrode 21 to reduce spreading resistance and parasitic resistance effects associated with the upper electrode 21 can be run along the upper electrode 21 on top of the thick field oxide regions 65, whereby the capacitance associated with the metallization interconnect is minimized and the metal does not eclipse any light generated.

Figure 9:
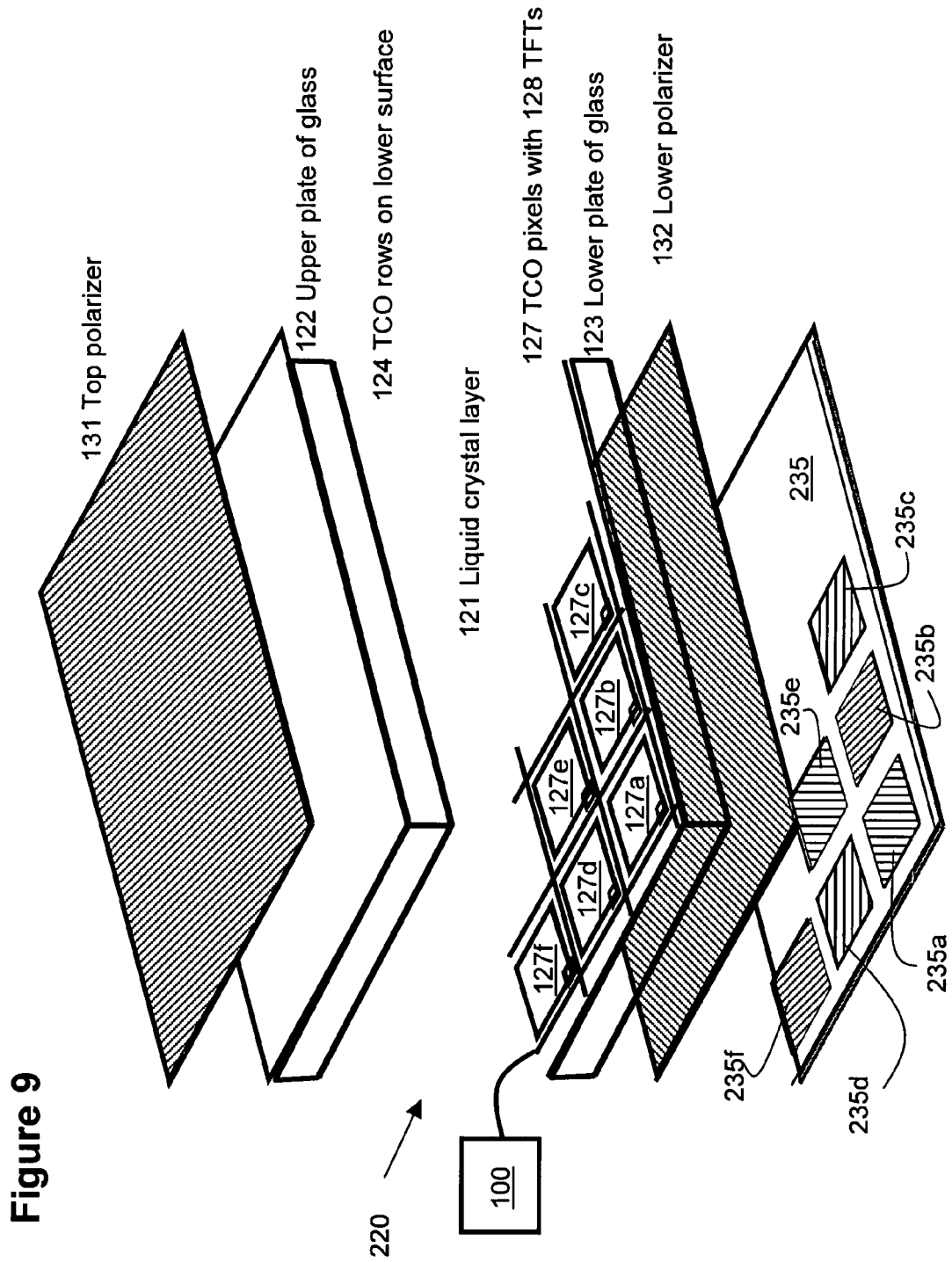
FIG. 9 is an exploded isometric view of an LCD display in accordance with an alternate embodiment of the present invention.

In an alternate embodiment of a liquid crystal display 220, illustrated in FIG. 9, the color filter layer 126 and the electro-luminescent layer 135 from the device of FIG. 4 are replaced by a multi-color electro-luminescent solid-state device 235, which has an array of colored micro-panels, which alternate in color between red, green and blue (R, G & B). The remaining elements in the display 220, i.e. the upper and lower glass plates 122 and 123, the TCO layers 124 and 127, the TFT elements 128, and the upper and lower polarizers 131 and 132, are identical or similar to like numbered elements in the device of FIG. 4. Typically, each pixel 127a to 127f in the liquid crystal display 220 has at least one of each of the color micro-panels, i.e. R, G & B, associated therewith; however in another possible embodiment, illustrated in FIG. 9, each colored micro-panel 235a to 235f has only one TCO pixel 127a to 127f aligned therewith. In the LCD 220, the colored micro-panels 235a to 235f can be kept on at all times, and the pixels 127a to 127f determine the amount of each color that passes through the LCD display 220; however, independent control of the micro-panels 235a to 235f is also possible by providing addressing means with drivers and control electronics. In another possible embodiment one of each of the colored panels 235a to 235f is aligned with several LC pixels 127a to 127f; however, having a panel to LC pixel ratio less than or greater than one is also possible, depending on the quality of the LC display required. The separate colored light emitting panels are several times more efficient than filtering the colored components out of white light with a color filter, as in the prior art. Moreover, by eliminating the light diffusers and other interconnect components an even higher efficiency can be achieved.

Figure 10:
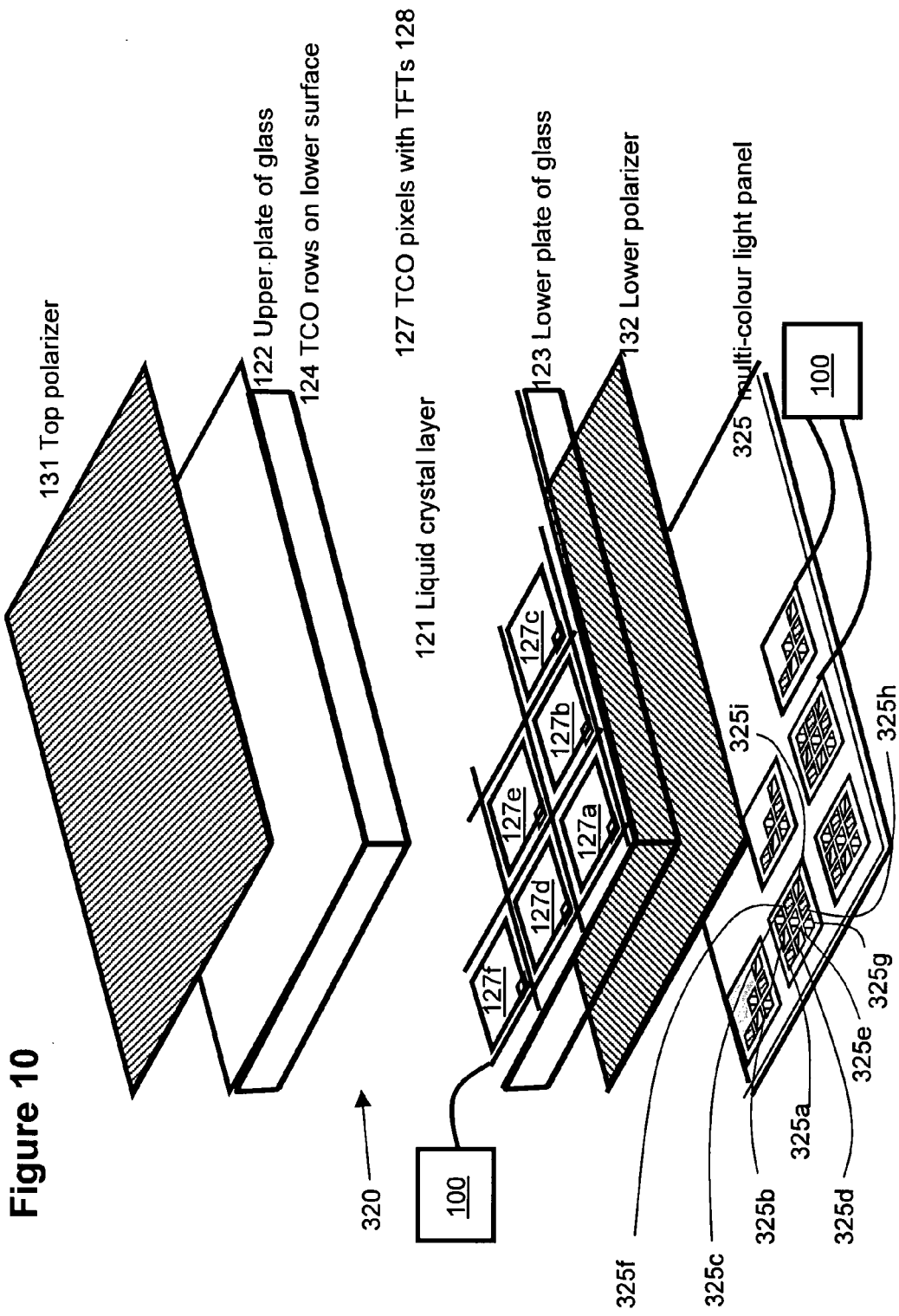
FIG. 10 is an exploded isometric view of an LCD display in accordance with an alternate embodiment of the present invention.

In an alternate embodiment, illustrated in FIG. 10, a color liquid crystal display 320 includes a multi-color light panel 325, in which each pixel 127a to 127f has a plurality of micro-panels, e.g. micro-panels 325a to 325i, including one or more of each color (R,G & B) aligned therewith. Accordingly, a micro-controller 100 can control the pixels 127a to 127f and the micro-panels 325a to 325i under each pixel to provide a field sequential color (FSC) liquid crystal display. The pattern of micro-panels 325a to 325i may be finely defined so as to present an appearance of uniform color, e.g. white, behind each pixel 127a to 127f. For the same reason, the different colored micro-panels 325a to 325i may be stacked on top of each other rather than side by side The illustrated embodiment includes three red 325c, 325e, 325g, three blue 325b, 325d, 325i, and three green 325a 325f, 325h micro-panels per LC pixel 127a to 127f, although any number of micro-panels, e.g. one micro-panel to a plurality of pixels, is possible depending on the required quality of the display 320. The remaining elements in the LCD display 320, i.e. the upper and lower glass plates 122 and 123, the TCO layers 124 and 127, the TFT elements 128, and the upper and lower polarizers 131 and 132, are identical or similar to like numbered elements in the device of FIGS. 4 and 9.

Figure 11:
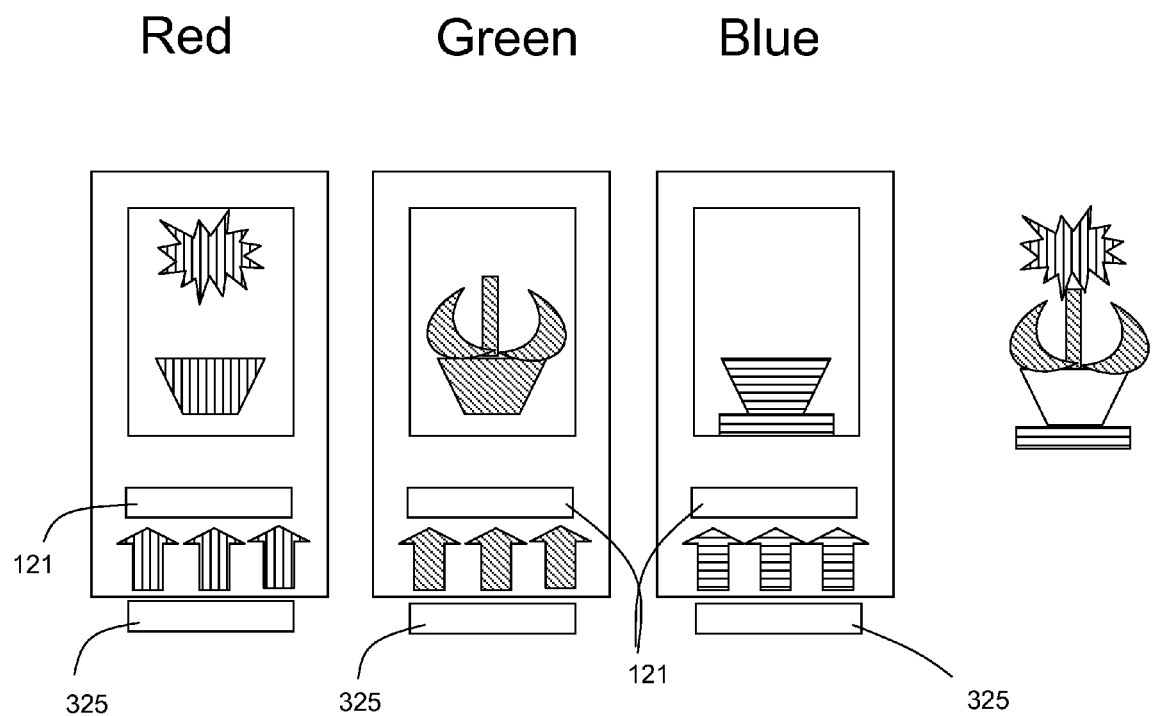
FIG. 11 illustrates a field sequential color system in accordance with the embodiment of FIG. 10.

The operation of a typical field sequential color (FSC) device 320 is as follows. All of the pixels 127a to 127f that require red light are activated by turning on the red micro-panels 325c, 325e, 325g under each pixel 127a to 127f that requires red, then all of the pixels 127a to 127f that require green light are activated by turning on the green sub-pixel micro-panels 325c, 325e, 325g under each pixel 127a to 127f that requires green light, and then all of the pixels 127a to 127f that require blue light are activated by turning on the blue sub-pixels micro-panels 325b, 325d, 325i under each pixel 127a to 127f that requires blue sequentially, whereby the LCD 320 passes the corresponding portions of each color making up the desired image. The viewer's eye integrates the combination of the three colors to form a full color image. In the example illustrated in FIG. 11, the red sub-pixels 325c, 325e, 325g corresponding to selected pixels making up the flower and pot are activated first, followed by the activation of the green sub-pixel micro-panels 325c, 325e, 325g corresponding to selected pixels making up the stem, leaves and pot, and finally by the activation of the blue sub-pixel micro-panels 325b, 325d, 325i corresponding to selected pixels making up the pot and base. The combination of the sequenced colors provides the viewer with a red flower, green leaves and stem, a blue base, and a white pot. The white color formed by the combination of the red, green and blue. The colored sub-pixel micro-panels 325a to 325i can be any set fraction, e.g. greater than or less than 1, of the size of the LC pixel 127a to 127f and do not have to be located only under them.

Electrical connections have to be provided so that all of the micro-panels of each color can be turned on and off as a group (e.g., a red group, a green group and a blue group). The different colored micro-panels are shown separated laterally; however, they may be stacked vertically for denser packing at the cost of process complexity. In the embodiment illustrated in FIGS. 12a and 12b, each pixel 127a to 127f has a single corresponding micro-panel, which is formed by a plurality of different stacks 32, 33 and 34 of organized layers, in which the active layers 35, 36 and 37 are separated by buffer layers 38, 39 and 40, respectively, comprised of a pure wide bandgap semiconductor or dielectric material, as disclosed above with reference to FIGS. 7a and 7b.

As above, for layered light emitting film structures driven by AC voltage, a pair of electrical contacts 52 and 53 are positioned on opposite sides of the stack of layers 32, while a separate pair of independently controllable electrical contacts 54 and 55 are positioned on opposite sides of the stack of layers 33, and a separate pair of independently controllable electrical contacts 56 and 57 are positioned on opposite sides of the stack of layers 34. Buffer layers 38, 39 and 40 are disposed between active layers 35, 36 and 37, respectively and next to the electrical contacts 52 to 56, as the current will flow in both directions as the voltage oscillates. Ideally the electrical contacts 52 to 56 are transparent, e.g. ITO, and the reflective layer or coating 50 is added between the electrode 57 and the remaining stack of layers 32 to 34 to reflect any light back through the stacks. In addition, isolation layers 59, between adjacent electrical contacts 53/54 and 55/56, must be provided in order that each colored stack 32, 33 and 34 can be independently controlled.

Figure 13:
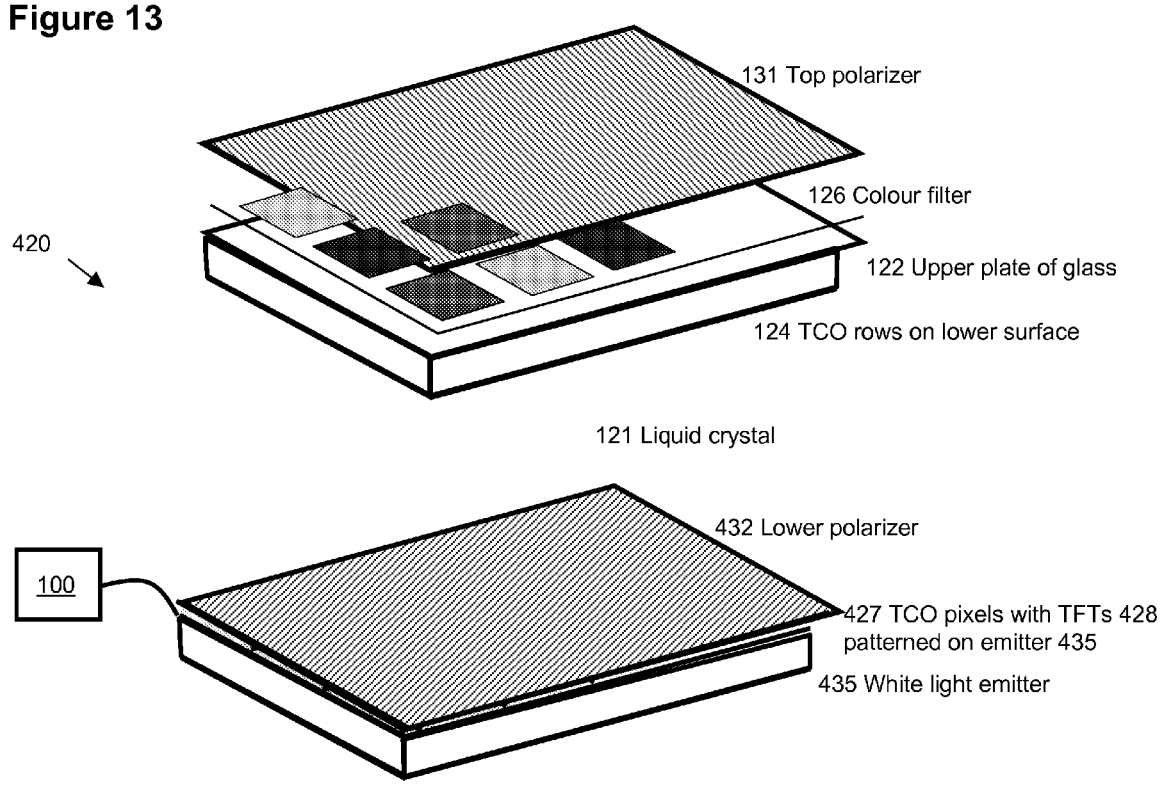
FIG. 13 is an exploded isometric view of an LCD display in accordance with an alternate embodiment of the present invention.

With reference to FIG. 13, another display 420, in accordance with the present invention, includes the liquid crystal layer 121 with an upper glass plate 122, an upper electrode layer 124, a color filter 126, and an upper polarizer 131, as in the display 120 of FIG. 4. However, instead of a lower glass plate 123 with TCO pixel layer 127 pixelated by TFT elements 128, the display 420 includes a electro-luminescent solid-state device 435 with a lower electrode layer 427 pixelated by TFT elements 428 (or other suitable means) patterned directly thereon, thereby eliminating the need for a lower glass plate 123 and separate activating electronics for both the liquid crystal layer 121 and the EL device 435. A polarizing layer 432 is mounted on and supported by the EL device 435 adjacent the liquid crystal layer 121 rather than on the underside of the lower glass plate 123, as in FIG. 4. Preferably, the EL device 435 is similar or identical to the aforementioned EL device 135 with two or more micro-panels generating white light.

Figure 14:
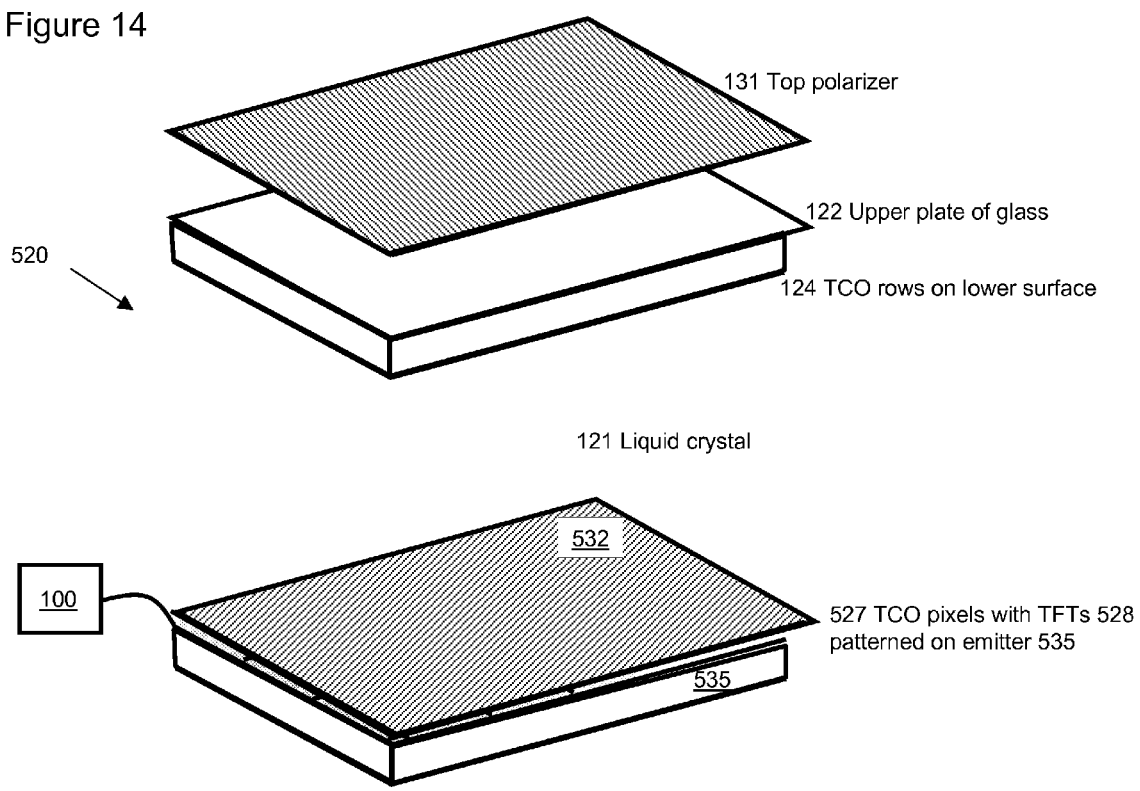
FIG. 14 is an exploded isometric view of an LCD display in accordance with an alternate embodiment of the present invention.

With reference to FIG. 14, another display 520, in accordance with the present invention, includes the liquid crystal layer 121 with an upper glass plate 122, and an upper polarizer 131, as in the display 220 of FIG. 9. However, instead of a lower glass plate 123 with lower electrode layer 127 defined by TFT elements 128, the display 520 includes a colored electro-luminescent solid-state device 535, similar to multi-color light micro-panels 235 or 325, with a lower electrode layer 527 pixelated by TFT elements 528 patterned directly thereon, thereby simplifying and reducing the cost of the entire assembly. A polarizing layer 532 is mounted on and supported by the EL device 535 adjacent the liquid crystal layer 121 rather than on the underside of the lower glass plate 123, as in FIG. 9. The material forming the polarizing layer 532 is compatible with LC chemistry and/or any surface layers usually patterned on the inner surface of the device 535. In a variant of this configuration, the TCO layers 124 and 527 may be reversed, i.e. the TFT-controlled TCO layer (527/528) may be placed on the upper glass plate 122 and the TCO rows 124 placed on the emitter panel 535. In either of these cases, the emissive film, e.g. 20, 20', 20", may be placed on either surface of the emitter panel 535.

Figure 15:
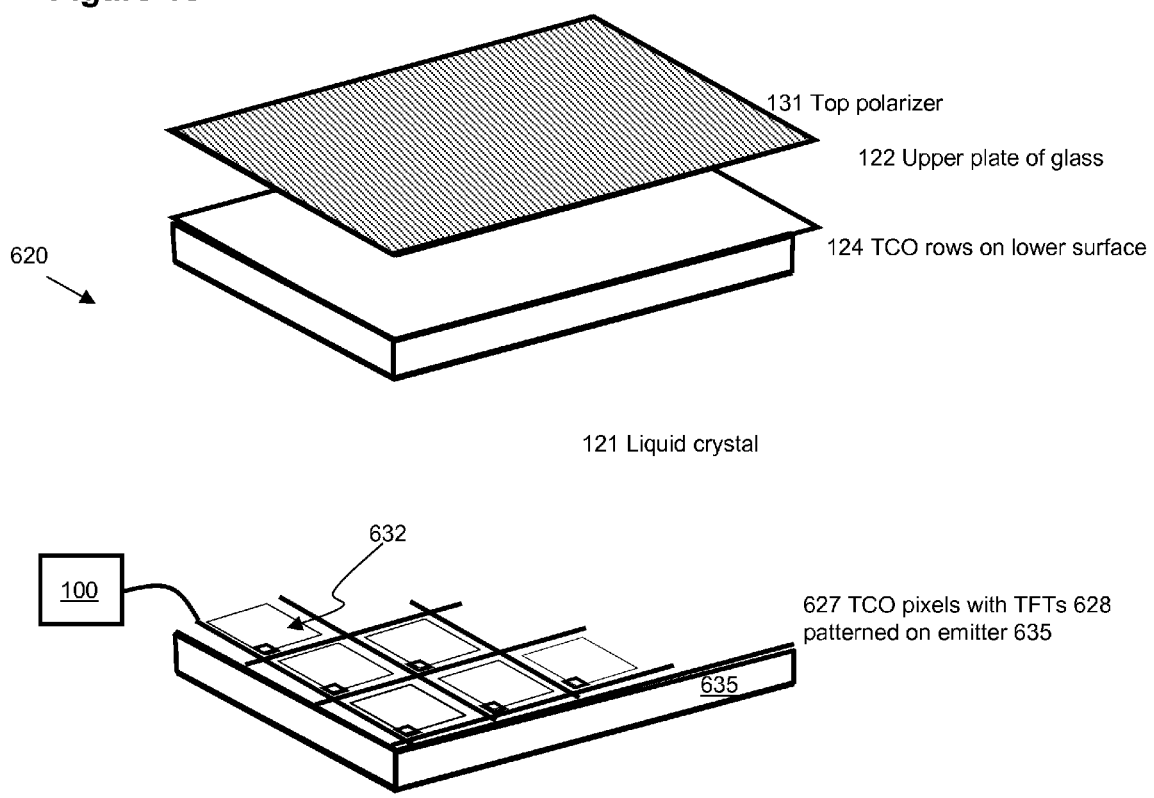
FIG. 15 is an exploded isometric view of an LCD display in accordance with an alternate embodiment of the present invention.

With reference to FIG. 15, another display 620, in accordance with the present invention, includes the liquid crystal layer 121 with an upper glass plate 122, and an upper polarizer 131, as in the displays 220 and 520 of FIGS. 9 and 14, respectively. However, instead of a lower glass plate 123 with lower electrode layer 127 pixelated by TFT elements 128, the display 620 includes a colored electro-luminescent solid-state device 635, similar to multi-color light micro-panels 235 or 325, with a lower electrode layer 627 pixelated by TFT elements 628 patterned directly thereon, thereby simplifying and reducing the cost of the entire assembly. A polarizing layer 632 is patterned directly on the EL device 635 adjacent the liquid crystal layer 121 rather than on the underside of the lower glass plate 123, as in FIG. 9. Preferably, the polarizing layer 632 comprises a thin film polarizer, which includes arrays of thin parallel lines (or grooves) etched in the materials. Advanced LC designs already nanostructure the inner surface of the display to enhance performance, the thin film polarizer in accordance with the present invention would be an extension of the nano-structured processes. The material forming the polarizing layer 632 is compatible with LC chemistry and/or any surface layers usually patterned on the inner surface of the device 635. In a variant of this configuration, the TCO layers may be reversed, ie the TFT-controlled TCO layer (527/528) may be placed on the upper glass plate 122 and the TCO rows 124 placed on the emitter panel 535. In any of these cases, the emissive film may be placed on either surface of the emitter panel 535.

With reference to any of the LCD displays 120, 220, 320, 420, 520 and 620 in FIGS. 4, 9, 10, 13, 14 or 15, additional control circuitry in micro-controllers 100 may be provided for controlling the voltage supplied to each micro-panel, such that groups of selected micro-panels 135a to 135f or 235a to 235f or 325a to 325g in the EL devices 135, 235, 325, 435, 535 or 635 may be dimmed in areas of the display in which the picture is momentarily darker, e.g. dimmed in pixels adjacent to black or closed pixels; or brightened as a group in areas of the display in which the picture is momentarily brighter, e.g. brightened in pixels adjacent to white or open pixels. As a result, enhanced contrast and reduced power consumption is possible.

Furthermore, additional control circuitry in the micro-controllers 100 may also enable rows of the micro-panels, e.g. 135a to 135f or 235a to 235f or 325a to 325g, in the layered light emitting film structures 135, 235, 325, 435, 535 or 635 to be sequenced as a group in synchronism with the refresh scanning of the LCD pixel data. Accordingly, in the time when the LCD pixels are neither "ON" or "OFF" the micro-panels are turned off and do not emit light, thereby reducing motion artifacts, providing enhanced contrast, and reducing power consumption.

We claim:

1. A display comprising:
   an electro-luminescent film structure for emitting light including an array of separate light emitting micro-panels;
   a first polarizer for filtering the light emitted from the electro-luminescent device, thereby selectively emitting light of a first polarization;
   a liquid crystal layer for rotating the polarization of the light passing therethrough to a second polarization in response to an electric field applied thereto;
   first and second electrodes for applying the electrical field to the liquid crystal layer including pixelating means for addressing individual pixels within at least one of the first and second electrodes, whereby the electric field is appliable to selected pixels for rotating the polarization of the light passing therethrough; and
   a second polarizer for filtering the light emitted from the liquid crystal layer, thereby selectively passing light of the second polarization.

2. The display according to claim 1, wherein the electro-luminescent film structure comprises:
   a first active layer including a concentration of luminescent centers for emitting light at a first wavelength;
   a first buffer layer comprising a wide bandgap semiconductor or a dielectric material adjacent the first active layer; and
   a set of electrodes for applying an electric field to the first active and first buffer layers;
   wherein the first buffer layer has a thickness whereby electrons gains sufficient energy from the electric field when passing through the first buffer layer to excite the luminescent centers in the first active layer via impact ionization or impact excitation at a sufficient excitation energy to emit light at the first wavelength.

3. The display according to claim 2, wherein the electro-luminescent structure further comprising:
   a plurality of additional first active layers; and
   a plurality of additional first buffer layers forming a first stack with first active layers alternating with first buffer layers between the set of electrodes.

4. The display according to claim 3, wherein the electro-luminescent structure further comprises:
   a plurality of second active layers, each including a concentration of luminescent centers for emitting light at a second wavelength, which is different from the first wavelength; and
   a plurality of second buffer layers comprising a wide bandgap semiconductor or dielectric material interleaved with the plurality of second active layers;
   wherein each of the second buffer layers has a thickness, whereby electrons gains sufficient energy from the electric field when passing through the second buffer layers to excite the luminescent centers in the second active layers via impact ionization or impact excitation at an excitation energy to emit light at the second wavelength.

5. The display according to claim 4, wherein the first and second wavelengths are combined with or without additional wavelengths to form white light.

6. The display according to claim 5, further comprising a color filter including a plurality of sections for transmitting different colors of light, each section associated with at least one pixel.

7. The display according to claim 6, wherein each section of the color filter is associated with only one pixel.

8. The display according to claim 6, wherein the sections of the color filter alternate between red, green and blue colored filter sections.

9. The display according to claim 1, further comprising:
   an upper transparent substrate on which the first electrode and the upper polarizer are mounted;
   wherein the second electrode, the pixelation means and the lower polarizer are mounted on the electro-luminescent device, whereby the liquid crystal layer is sandwiched between the upper transparent substrate and the electro-luminescent device.

10. The display according to claim 1, further comprising:
    an upper transparent substrate on which the first electrode, the pixelation means and the upper polarizer are mounted;
    wherein the second electrode, and the lower polarizer are mounted on the electro-luminescent device, whereby the liquid crystal layer is sandwiched between the upper transparent substrate and the electro-luminescent device.

11. The display according to claim 1, wherein the electro-luminescent structure includes a first plurality of micro-panels for emitting a first colored light, a second plurality of micro-panels for emitting a second colored light.

12. The display according to claim 11, wherein each micro-panel is associated with only one pixel.

13. The display according to claim 11, wherein a red light emitting micro-panel, a green light emitting micro-panel and a blue light emitting micro-panel are provided for each pixel.

14. The display according to claim 11, wherein the first plurality of micro-panels emit red colored light, the second plurality of micro-panels emit green colored light; and wherein the electro-luminescent structure also includes a third plurality of micro-panels for emitting a blue colored light.

15. The display according to claim 14, further comprising color sequencing means for alternating between emitting light from the red, green and blue light emitting micro-panels in each pixel at a frequency whereby a viewer views a combined image including red, green and blue light.

16. The display according to claim 11, further comprising an upper transparent substrate on which the first electrode is mounted; wherein the second electrode, the pixelation means and the lower polarizer are mounted on the electro-luminescent structure, whereby the liquid crystal layer is sandwiched between the upper transparent substrate and the electro-luminescent structure.

17. The display according to claim 16, wherein the lower polarizer is patterned on the electro-luminescent structure.

18. The display according to claim 1, further comprising control means for dynamically changing the brightness of the micro-panels in accordance with a required picture brightness in an area of the display, to enhance contrast and reduce power consumption.

19. The display according to claim 1, further comprising control means for turning selected micro-panels off, while corresponding pixels are refreshing, thereby reducing motion artifacts, providing enhanced contrast, and reducing power consumption.

20. The display according to claim 1, wherein the electro-luminescent film structure comprises:
- a substrate;
- a lower electrode supported by the substrate for applying an electric field;
- a pattern of field oxide regions on the substrate forming wells therebetween;
- a multi-layer light emitting film disposed over the field oxide regions and into the wells, whereby the light emitting film disposed in the wells forms the micro-panels; and
- an upper electrode disposed over the light emitting film for applying the electric field to the micro-panels.

21. The display according to claim 20, wherein the multi-layer light emitting film includes layers of a first material for emitting light at a first wavelength, and layers of a second material for emitting light at a second wavelength, whereby the first and second wavelengths are included in a combination to form white light.

22. The display according to claim 20, wherein the multi-layer light emitting film includes layers of a first material controlled by a first set of contacts for emitting light at a first wavelength, and layers of a second material controlled by a second set of contacts, isolated from the first set of contacts, for emitting light at a second wavelength, whereby the first and second wavelengths are selectively emitted together or separately.

23. The display according to claim 1, wherein each micro-panel in the electro-luminescent film structure includes active layers of a first material controlled by a first set of contacts for emitting light at a first wavelength; active layers of a second material superposed on the active layers of the first material, controlled by a second set of contacts, isolated from the first set of contacts, for emitting light at a second wavelength; and active layers of a third material superposed on the active layers of the second material controlled by a third set of contacts, isolated from the first and second set of contacts, for emitting light at a third wavelength, whereby the first, second and third wavelengths are selectively emitted together or separately.

24. The display according to claim 23, further comprising color sequencing means for alternating between emitting the red, green and blue light from the first, second and third active layers in each pixel at a frequency whereby a viewer views a combined image including red, green and blue light.

25. The display according to claim 1, wherein the electro-luminescent film structure comprises: a multi-layer light emitting film subdivided into the micro-panels, which are electrically isolated from each other.

* * * * *